007# UNITED STATES PATENT OFFICE.

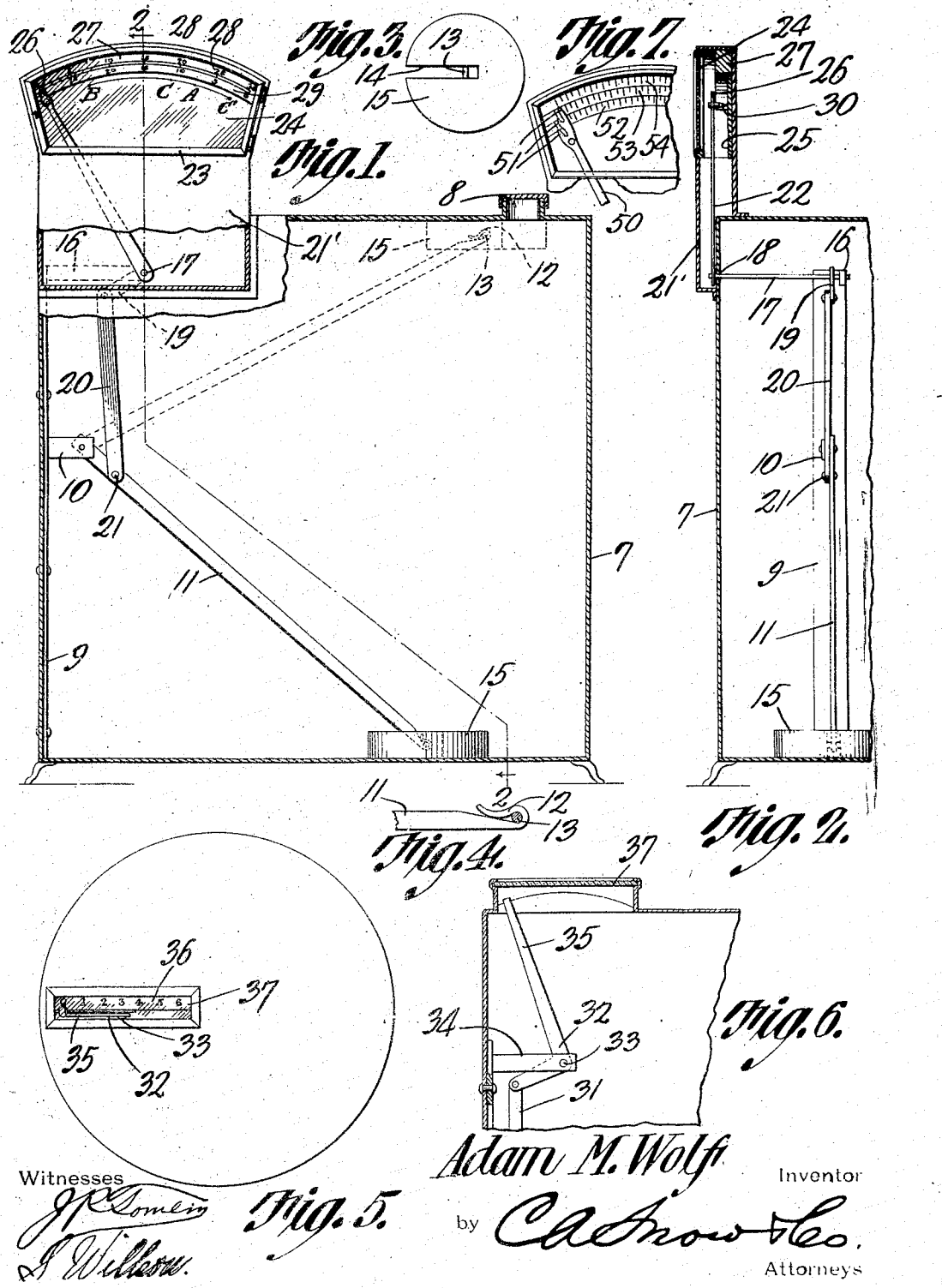

ADAM M. WOLF, OF PLYMOUTH, WISCONSIN.

INDICATING AND REGISTERING MECHANISM FOR TANKS.

1,136,576.  Specification of Letters Patent.  Patented Apr. 20, 1915.

Application filed May 21, 1914. Serial No. 840,082.

*To all whom it may concern:*

Be it known that I, ADAM M. WOLF, a citizen of the United States, residing at Plymouth, in the county of Sheboygan and State of Wisconsin, have invented a new and useful Indicating and Registering Mechanism for Tanks, of which the following is a specification.

This invention relates to improvements in mechanisms for indicating and registering the quantity of a liquid supplied to and delivered from a tank.

An object of the present invention is to provide a mechanism for registering the quantity of liquid flowing through and remaining in a tank, and which mechanism automatically prevents the supply of a liquid to the tank in excess of the capacity thereof.

A further object is to provide an indicating arm moving over a graduated scale, the clockwise reading of which indicates the quantity of liquid within a tank and the anti-clockwise reading of which taken from some arbitrary point, indicates the quantity of liquid discharged from the tank, the said arbitrary point representing the quantity of liquid within the tank prior to the discharge of the liquid therefrom the volume of which discharge it is desired to determine.

A further object is to provide a registering mechanism with a scribable surface and a marker moving thereover, thus automatically recording the quantity of a liquid supplied to a tank and the amount discharged therefrom.

A further object is to provide a registering and indicating mechanism in which an indicating arm is provided with a plurality of offset extremities. In reading the scale that extremity is used which corresponds to the specific gravity of the liquid within the tank.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in section of a tank with my improved indicating and recording mechanism affixed thereto. Fig. 2 is a cross sectional view taken on the line 2—2 of Fig. 1. Fig. 3 is a top plan view of the float employed in connection with the foregoing. Fig. 4 is a fragmental view in section of the lower extremity of the float carrying arm. Fig. 5 is a top plan view of a somewhat modified form of mechanism. Fig. 6 is a fragmental view in section of the modification. Fig. 7 is a fragmental detail view of the multi-indicating arm.

Referring to the drawings in which similar reference numerals designate corresponding parts throughout the several views, a tank 7 is provided with the inlet opening 8 through which a liquid may be introduced for the filling of the tank. Secured to one wall of the tank is the upright or standard 9 which is adapted to support the actuating portions of the mechanism herein described. A bearing member 10 projects laterally from the standard 9, to which is pivotally secured a float carrying arm 11. The lower extremity of the float carrying arm 11, as illustrated in Fig. 4, is curled or bent upon itself as at 12 and rotatably receives the pin 13 therein, the said pin extending across the slot 14 with which the float 15 is provided. The length of the float carrying lever or arm 11 is such that when the tank is filled, the float will assume the position indicated by dotted lines in Fig. 1, closing the inlet 8 and preventing the further supply of the liquid to the tank.

An outstanding bearing 16 is carried by the standard 9, through which extends the shaft 17 the latter being journaled through the side wall as at 18, effecting a rotatable but liquid-tight joint therewith. A crank arm 19 is rigidly secured to the shaft 17 and oscillates the same through the intervention of the link 20. The link 20 is pivotally secured as at 21 to the float carrying lever 11 so that movements of the float will result in the rotation of the shaft 17.

Rigidly secured to the tank 7 is the casing 21', the latter receiving the extremity of the shaft 17 therein, upon which shaft and external of the tank, is mounted the indicating arm 22. The casing 21' is provided with the door 23, the same having the glass panel 24 therein. To the rear portion of the casing is secured the scribable member 25, the same being of slate or allied material, upon which a line may be readily marked and easily erased. The indicating arm terminates in the pointed end 26 which travels over the scale block 27 upon whose face is graduated the scales 28 and 29. The uppermost scale 28 reads in a clockwise direction, while the lower scale 29 is reversely arranged. A scribing member 30 is carried by the indicating arm and draws a line upon the member 25, to thus form a temporary record of the extent of movement of the float.

In the modified forms illustrated in Figs. 5 and 6, the link 31 is pivotally connected to the bell crank lever 32, the same being pivotally connected at 33 to the supporting arm 34. The upper arm 35 of the bell crank lever acts in the capacity of a pointer extending above and over the graduated scale 36 and indicating upon said scale the position of the float in the tank. The said scale 36 is visible from above through the transparent member 37 as illustrated in Fig. 5.

The operation of the mechanism will be readily understood, the float moving the arm across the scale and thus denoting the height and therefore the volume or quantity of liquid within the tank. The lines which have been placed upon the plate 25 are erased after the tank has been filled. As the liquid is discharged from the tank, a line is drawn as illustrated for example, from A to B. This will therefore indicate the quantity of liquid discharged from the tank. After the said quantity has been discharged, a quantity may be introduced which will then draw the line B—C or B—C' inasmuch as the point A was noted at the time the lines were previously erased, the quantity of liquid drawn from the tank and subsequently introduced therein, may be readily determined regardless of whether C falls internally or exteriorly of the points A—B. The line A—B in terms of the lower scale 29, indicates the quantity of liquid withdrawn from the tank so that line B—C or B—C' in terms of the upper scale 28, determines the quantity of liquid introduced within the tank. After the line B—C has been drawn or traced, the lines are erased, after which the liquid in the tank may be withdrawn as desired. The pointed end 26 as read upon the top scale, indicates the quantity of liquid within the tank and as determined upon the bottom scale indicates the quantity of liquid which may be introduced within the tank in order to completely fill the same.

The indicating arm 50 as illustrated in Fig. 7, is provided with a number of indicating fingers 51 which are offset one with relation to the other and are readable upon the scales 52, 53 and 54. The different scales 52, 53 and 54 are plotted and the indicating fingers 51 are arranged so as to read correctly for different grades of oil or other liquid. Thus with an oil of relatively low specific gravity, one of the indicating fingers 51 is taken as the measure of the scale reading, while for a liquid of relatively high specific gravity, one of the other fingers will be employed.

The link connection is such that the reading is in a clockwise direction, the same being the conventional direction for indicating instruments.

Having thus described my invention, what I claim is:—

1. The combination with a tank having an inlet opening, of a lever pivotally disposed therein, a float carried by said lever, a casing carried by said tank, a shaft extending through one wall of the said tank into said casing, an arm carried by said shaft mechanically connected to said float carrying lever, an indicating arm carried by said shaft, the said casing provided with a pair of oppositely graduated scales disposed therein, a scribable surface disposed within said casing adjacent said scales, and a scribing element carried by said indicating arm.

2. The combination with a tank, of a lever pivotally disposed therein, a float carried by said lever, a casing carried by said tank, a shaft extending through one wall of the said tank into said casing, an arm carried by said shaft mechanically connected to and actuated by said float carrying lever, an indicating arm carried by said shaft and provided with offset indicating fingers for liquids having different specific gravities, a scribable surface disposed within said casing, and a scribing element carried by the indicating arm.

In testimony that I claim the foregoing as my own, I have hereto affixed my signature in the presence of two witnesses.

ADAM M. WOLF.

Witnesses:
OTTO BERGEMANN,
ELLA BRIESKE.